United States Patent
Bornemann

(10) Patent No.: US 11,312,422 B2
(45) Date of Patent: Apr. 26, 2022

(54) CONTROL STATION FOR A SOIL-PROCESSING MACHINE

(71) Applicant: Hamm AG, Tirschenreuth (DE)

(72) Inventor: Detlef Bornemann, Leonberg (DE)

(73) Assignee: HAMM AG, Tirschenreuth (DE)

( * ) Notice: Subject to any disclaimer, the term of this patent is extended or adjusted under 35 U.S.C. 154(b) by 0 days.

(21) Appl. No.: 16/805,923

(22) Filed: Mar. 2, 2020

(65) Prior Publication Data

US 2020/0283075 A1    Sep. 10, 2020

(30) Foreign Application Priority Data

Mar. 4, 2019   (DE) .................... 10 2019 105 313.4

(51) Int. Cl.
*E02D 3/026*    (2006.01)
*B62D 25/24*    (2006.01)

(52) U.S. Cl.
CPC .............. B62D 25/24 (2013.01); *E02D 3/026* (2013.01)

(58) Field of Classification Search
CPC ......... B62D 25/24; E02D 3/026; E01C 19/26; E02F 9/16
USPC .............................. 296/146.1, 190.08, 190.11
See application file for complete search history.

(56) References Cited

U.S. PATENT DOCUMENTS

| | | | | |
|---|---|---|---|---|
| 3,486,273 A * | 12/1969 | Williams | ........... | B62D 33/0617 49/389 |
| 3,572,615 A * | 3/1971 | Firestone | ................ | B64C 1/28 244/13 |
| 4,062,420 A * | 12/1977 | Stedman | ............ | B62D 33/0604 180/89.1 |
| 4,501,045 A * | 2/1985 | Boyer | ..................... | E05D 11/06 16/331 |
| 5,413,188 A * | 5/1995 | Ui | .......................... | B60J 5/0487 180/89.12 |
| 5,664,909 A * | 9/1997 | Lindgren | ................ | E01C 19/26 180/326 |
| 7,246,846 B2 * | 7/2007 | Shioji | ..................... | E02F 9/163 180/89.12 |
| 2006/0034661 A1 * | 2/2006 | Junga | ................ | B62D 33/0633 404/128 |
| 2016/0176449 A1 * | 6/2016 | Kazakoff | ................ | B60J 5/062 296/190.1 |

FOREIGN PATENT DOCUMENTS

| | | | | |
|---|---|---|---|---|
| DE | 263911 | | 1/1989 | |
| DE | 4404415 | | 8/1995 | |
| FR | 2901833 | A1 * | 12/2007 | .......... B62D 35/008 |
| JP | H08100443 | | 4/1996 | |

(Continued)

OTHER PUBLICATIONS

Machine Language Translation of JP 2012250789.*

(Continued)

*Primary Examiner* — D Glenn Dayoan
*Assistant Examiner* — Kevin P Weldon
(74) *Attorney, Agent, or Firm* — Rankin, Hill & Clark LLP

(57) ABSTRACT

A control station for a soil-processing machine includes a control station floor region and at least one floor window provided in the control station floor region. The floor window in the control station floor region is supported so that it can swivel between an open position and a closed position.

13 Claims, 2 Drawing Sheets

(56) References Cited

FOREIGN PATENT DOCUMENTS

JP    2012250789    12/2012

OTHER PUBLICATIONS

Machine Language Translation of JPH08100443.*
European Search Report filed in EP 20 15 9676 dated Jun. 22, 2020.
German Search Report filed in App No. 10 2019 105 323.4 dated Jan. 13, 2020.

* cited by examiner

CONTROL STATION FOR A SOIL-PROCESSING MACHINE

The present invention relates to a control station, particularly for a soil-processing machine in which, for example, an operating person can take their place on a self-propelled soil compactor.

In order to enable an operating person who is operating a soil-processing machine as clear as possible visibility of the machine and the ground to be processed by the machine, on such control station in relevant side wall regions of the same windows and/or doors are provided which may also reach a control station floor region of such a control station. In the control station floor region itself floor windows may also be provided through which an operating person can have improved visibility in the direction of the ground or, in the case of a soil compactor, in the direction of the compression rollers.

It is the task of the present invention to provide a control station, particularly for a soil-processing machine such as, for example, a soil compactor, in which the possibility of the action on floor windows provided in a control station floor region exists.

According to the invention, this task is solved by a control station, particularly for a soil-processing machine, such as, for example, a soil compactor, comprising a control station floor region and at least one floor window provided in the control station floor region, wherein the floor window in the control station floor region is supported so that it can swivel between an open position and a closed position.

Due to the swivellable arrangement of such a floor window in the control station floor region, there is the possibility, on the one hand, of positioning the floor window in its closed position, to close off the control station floor region and therefore, for example, also to prevent the penetration of water or soil material into the interior of the control station. By swivelling a floor window in the direction of its open position or into an intermediate position between the closed position, in the open position there is also the possibility of obtaining access to the outside of the window from the interior of the control station, that can only be accessed with difficulty, for example, to clean it.

To do this, it is particularly advantageous if at least one, preferably every, floor window provided in the control station floor region can be swivelled from the closed position to the open position in the direction towards a control station interior. Therefore, a person located in the control station can clean the outside of the floor window with the floor window swivelled into the open position.

For a stable swivel arrangement, it is proposed that at least one, preferably every, floor window provided in the control station floor region is supported so that it can swivel in at least one swivel connection region, preferably two swivel connection regions, on the control station floor region. To do this, at least one, preferably every, swivel connection region may comprise a hinge.

To be able to swivel such a floor window easily between its closed position and its open position, it is proposed that at least one, preferably every floor window provided in the control station floor region can be swivelled about a swivel axis essentially orthogonal to a control station longitudinal direction.

At least one control station side wall region must be adjacent to the control station floor region. To avoid a collision of the floor window when swivelling into the open position with such a control station side wall region, it is proposed that at least one, preferably every, floor window provided in the control station floor region exhibits a floor window edge region located closer to an adjacent control station side wall region and a floor window edge region located further away from the adjacent control station side wall region, and that at least one, preferably every, floor window is supported on the control station floor region so that it can swivel in the region of its floor window edge region located further away from the adjacent control station side wall region. It is to be noted that in the sense of the present invention, that control station side wall region exhibiting the smallest distance from the relevant floor window is considered as the adjacent control station side wall region.

Particularly if a control station according to the invention is to be put to use in connection with a soil-processing machine formed as a soil compactor, for adapting to the circumferential contour of the compression roller provided for that purpose it may be provided that the control station floor region exhibits a first essentially horizontal floor region section and at least one second floor region section adjacent to the first essentially horizontal and/or horizontally oriented floor region section and at an angle in relation to the essentially horizontal first floor region section, and that on at least one, preferably two mutually opposite end regions of the first floor region section at these two adjacent floor region sections is provided at least one floor window. Also, for ergonomic reasons it may be advantageous that such angled, therefore not essentially horizontally extending floor region sections are to be provided, in which an operating person can also rest their feet.

For such a floor window to assume defined positionings, even if it is not in its closed position, it is proposed that at least one, preferably every, floor window can be stopped in the open position and/or at least one intermediate position between the closed position and the open position.

For example, at least one, preferably every, floor window may be able to be stopped by at least one self-locking hinge in the open position and/or at least one intermediate position. Such a self-locking hinge is a hinge with such a stiff-running feature that this basically permits a swivel movement, on the basis of the friction exerted defined therein, but if no external operating forces are exerted on this or a floor window supported by it such that it can swivel, it remains in a preset swivel position.

Alternatively, it may be provided that at least one, preferably every, floor window can be stopped by the holding means fastened to the floor window and to the control station floor region, preferably a holding chain, holding rope or holding rod, in the open position and/or at least one intermediate position. Such holding rods are, for example, also used for pivot-hung windows and may be introduced into a guide groove of a stay arranged on a fixed frame and exhibit guide pins fastened to the window. Also folding and/or telescopic holding rods may be used.

To keep the interior of the control station inaccessible from the outside, particularly with the floor window in the closed position, it is proposed that fastenings are provided for fastening at least one, preferably every, floor window in the closed position in relation to the control station floor region.

To give an operating person the possibility of resting their feet in the region of a floor window on the control station floor region, without invoking an excessive load on the floor window, it is proposed that on at least one, preferably every, floor window, a support bridging the floor window at least partially, preferably completely, is provided.

Such a support may also be engaged, to swivel a floor window between its closed position and its open position.

The invention furthermore relates to a soil-processing machine, particularly a soil compactor, comprising a control station constructed according to the invention.

The present invention will be described in detail in the following in relation to the appended figures. In which.

Figure 1:
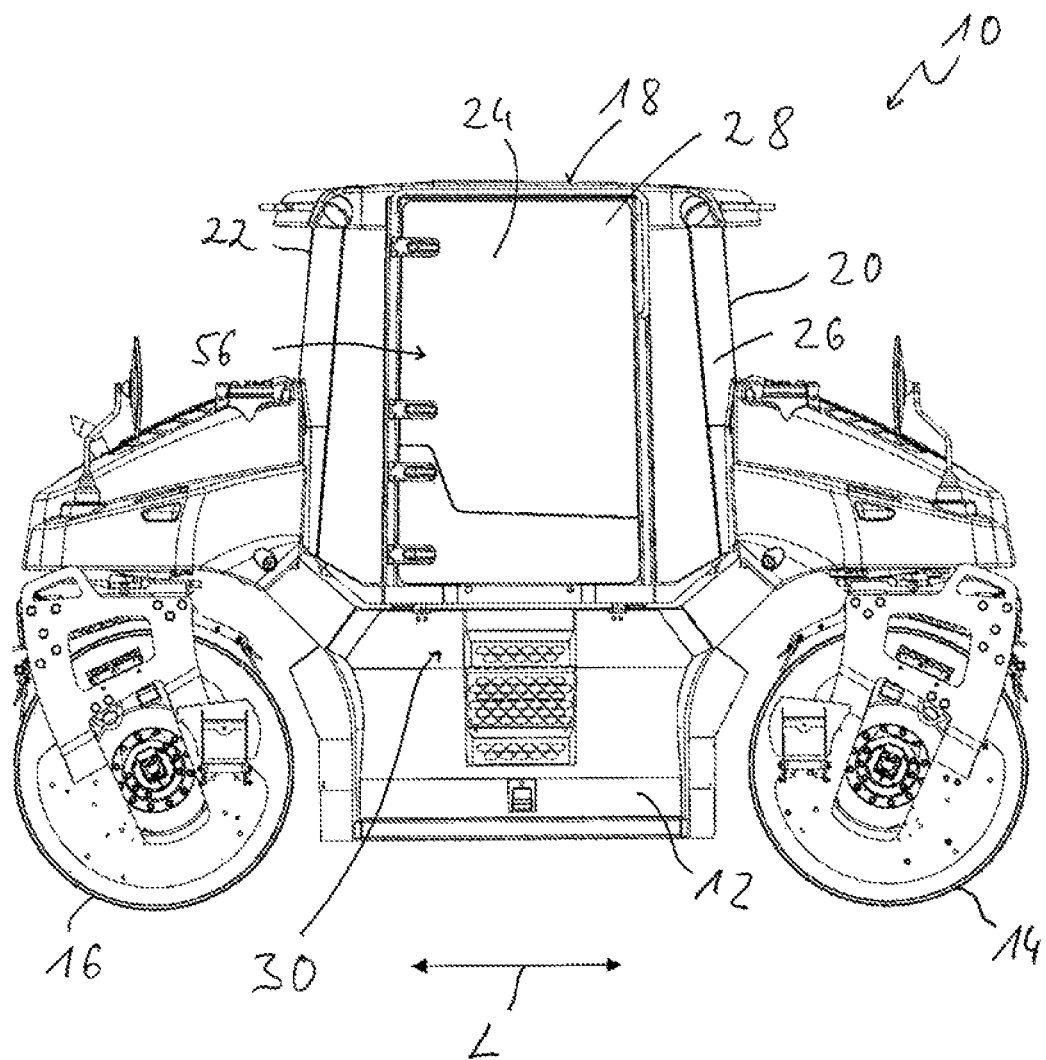
FIG. 1 shows a side view of a soil-processing machine designed as a soil compactor.

FIG. 1 illustrates the side view of a soil-processing machine in the form of a self-propelled soil compactor 10. The soil compactor 10 comprises a machine frame generally designated with 12, on which on both end regions situated in a compressor longitudinal direction L, respectively one compressor roller 14 and/or 16 is supported such that it can swivel about an approximately vertical swivel axis. The soil compactor 10 is constructed essentially symmetrically in the compressor longitudinal direction L so that with such a soil compressor 10 work can be done in the same way in both working directions.

On the machine frame 12 a control station generally designated with 18 is provided. The control station 18 generally also designated as a cab and/or a closed control station exhibits two control station side wall regions 20, 22 oriented in the compressor longitudinal direction L that may be designated as the front and/or rear control station side wall regions. The control station 18 furthermore exhibits two control station side wall regions oriented essentially transverse to the compressor longitudinal direction L, from which in FIG. 1 only the control station side wall region 24 can be seen and which may be designated as the lateral control station side wall regions. The control station side wall regions 20, 22, 24 extend essentially vertically. To give an operating person taking their place in the control station 18 as unimpeded visibility of all sides as possible, preferably in all control station side wall regions 20, 22, 24 windows 26 and/or doors 28 of glass or similar are provided.

Figure 2:
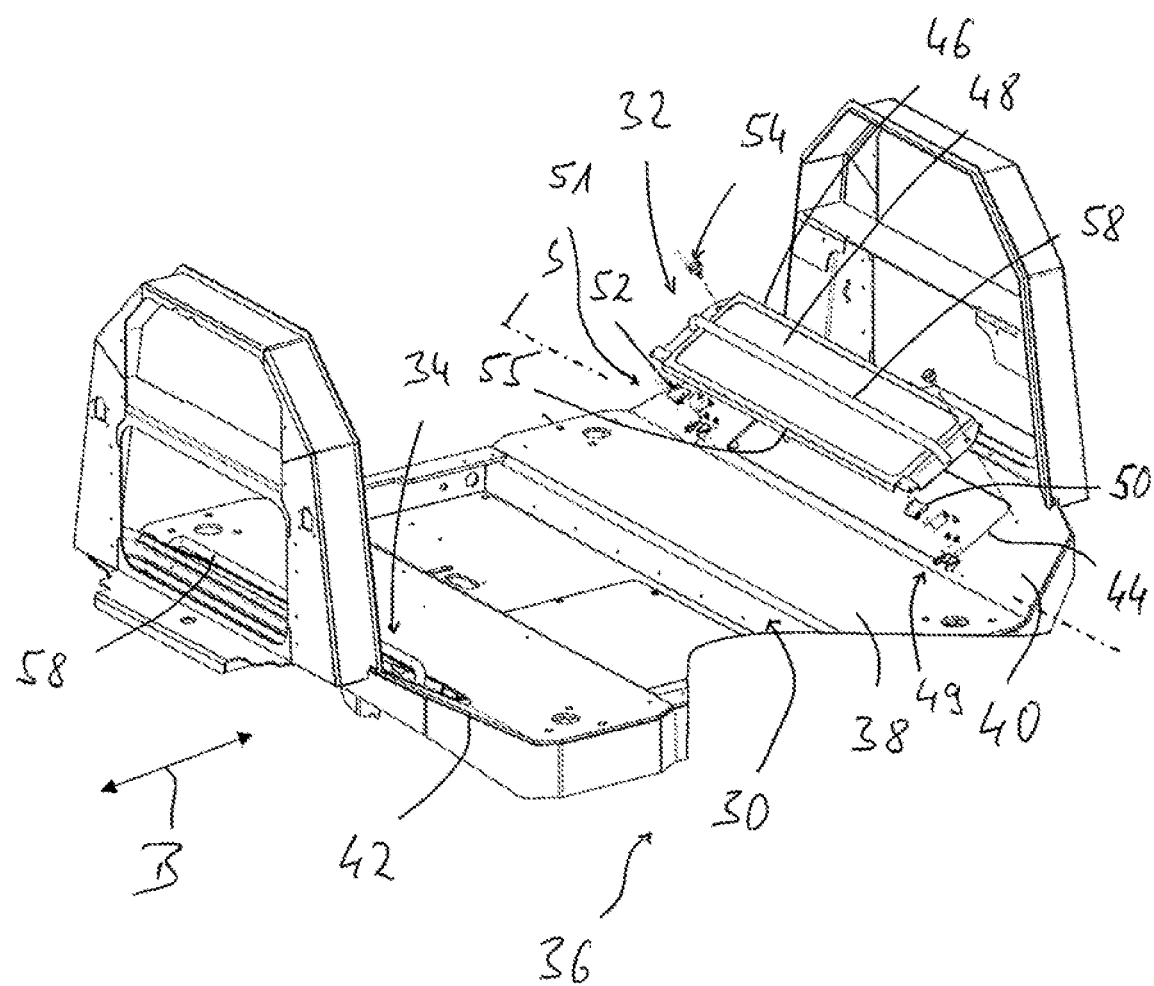
FIG. 2 shows a floor module with a control station floor region of a control station of the soil-processing machine of FIG. 1 with two floor windows provided in the control station floor region partially in exploded illustration.

To give an operating person taking their place in the control station 18 improved visibility of the ground to be processed and particularly also of the compression rollers 14, 16, as explained in the following with reference to FIG. 2, in a control station floor region 30 in the illustrative example shown two preferably mutually identically-formed floor windows 32, 34 are provided. Thus FIG. 2 shows a control station floor module 36 which essentially also provides the control station floor region 30. Thus the control station floor region 30 exhibits an essentially centrally-positioned first floor region section 38 in the compressor longitudinal direction L and/or also a control station longitudinal direction B which is essentially horizontally oriented, therefore provides an essentially horizontal support surface and/or a base for this, and is formed to accommodate, for example, a seat for an operating person. In the control station longitudinal direction B two second floor region sections 40, 42 connect to the first floor region section 38. These second floor region sections 40, 42 also facing both end regions of the soil compactor 10 situated in the compressor longitudinal direction L are angled in relation to the first floor region section 38 and/or in relation to the essentially horizontal support surface provided on this and are starting from its region adjacent to the first floor region section 38 inclined upwards away from the first floor region section 38. An angle of inclination of the second floor region sections 40, 42 in relation to a horizontal plane and/or the first floor region section 38 is generally less than 60°, preferably less than 50° and may, for example, be in the region of approximately 45°. It is to be noted in relation to FIG. 2 that, obviously, on the first floor region section 38 of the control station floor module 36 a floorboard covering this and then providing the equally horizontal support surface or such a floor covering may be provided.

In each of these two floor region sections 40, 42 one of the two floor windows 32, 34 is provided. As can be seen in connection with the floor window 32, for this purpose, in the control station floor region 38 and/or in the relevant second floor region section 40 and/or 42 a window opening 44 is provided. This may, when adjusting to the shape of the relevant floor window 40, 42, be transverse to the control station longitudinal direction B and exhibit an approximately rectangular opening contour.

As can also be seen using the floor window 32, each of the floor windows 32, 34 exhibit a window frame on which a window pane 48 constructed of glass or similar is firmly supported. In a floor window edge region 55 situated closer to the first floor region section 38 and therefore situated further away from a control station side wall region 20 and/or 22 provided adjacent to the relevant second floor region section 40, 42, the floor windows 32, 34 are supported so that they can swivel about a swivel axis S essentially orthogonal to the control station longitudinal direction B by two respective hinges 50, 52 providing swivel connection regions 49, 51. The window frame 46 is to be characterised in that with a floor window 32, 34 positioned in a closed position, it rests on a surface of the control station floor region 30 surrounding a respective window opening 44 and facing an interior 56 of the control station 16. By means of fastening 54 formed, for example, as screwed bolts or similar, a respective floor window 32, 34 may be fastened to the control station floor region 30 against swivelling from the interior 56.

A support 58 is provided on each of the floor windows 32, 24. These supports 58 formed as a bar shape bridge the respective floor window 32, 34 transverse to the control station longitudinal direction B essentially completely and are fastened to the end regions of the window frame 46 situated in the direction of the swivel axis S. Therefore, with floor windows 32, 34 positioned in its closed position an operating person may rest their feet also in the region of the second floor region sections 40, 42, without running the risk of excessive loading of the window panes 48 of the floor window 32, 34. To swivel a respective floor window 32, 34, such a support 58 may be grasped, so that this can also be used as a handle.

In the working region of the soil compactor 10, the floor windows 32, 34 may be positioned in their closed position in which the respective window frame 46 rests on the control station floor region 30 or on a fixed floor window frame region arranged on the control station floor region and the floor windows 32, 34 are fastened by fastening means 54. Thus the interior 56 is protected against the penetration of moisture or contamination. If the outside of the floor window 32, 34 is to be cleaned, this can be swivelled from the closed position towards the interior 56 into an open position in which, for example, the respective support 58 rests on the control station floor region 30. After cleaning the floor window 32, 34 these may be swivelled back into their closed position and fastened to the control station floor region 30.

To create the possibility of stopping the floor window 32, 34 in another position, for example, the hinges 50, 52 may be formed to be self-locking. In other words, the friction generated in the hinges themselves is of such a size that a respective floor window 32, 34 may only be moved by external exertion of force from its currently respectively assumed swivel position. Also other holding means, such as, for example, a holding chain, a holding rope and/or holding cable or a holding rod, which may act between the control station floor region 30 and the respective window frame 46 and allow a swivelling of the relevant floor window 32, 34 only up to a maximum swivel angle defined by such a holding means, may be used.

In a control station constructed according to the invention and/or a thus equipped soil-processing machine, by the provision of such floor windows there is the possibility of giving the operating person clear visibility of the ground situated directly in the region of the machine as well. Due to the swivellability of such a floor window, there is also the possibility of cleaning its outside, which is only difficult to access or inaccessible with the floor window positioned in the closed position. In so doing, it is particularly advantageous that such a floor window is swivelled from its closed position in the direction towards the interior of the control station, so that when positioning in the open position or an intermediate position, it can also be cleaned from the control station and/or there is access to the outside of the floor window from the control station.

It is obvious that such a floor window may also be provided on a control station floor region in other positionings, for example, also or alternatively in the first floor region section oriented essentially horizontally. Such floor windows may also exhibit other shapes.

The invention claimed is:

1. A control station for a soil-processing machine, comprising a control station floor region and at least one floor window provided in the control station floor region, wherein the at least one floor window in the control station floor region is supported so that the at least one floor region can swivel between an open position and a closed position,
   wherein the control station floor region has an essentially horizontal first floor region section and at least one second floor region section adjacent to the essentially horizontal first floor region section in a control station longitudinal direction and angled in relation to the essentially horizontal first floor region section,
   wherein a floor covering providing an essentially horizontal support surface of the first floor region section is provided,
   wherein at least one floor window of the at least one floor window is provided in at least one second floor region section of the at least one second floor region section, and wherein a support providing an operating person footrest is provided extending transversely to the control station longitudinal direction such as to at least partially bridge the at least one floor window provided in the at least one second floor region section of the at least one second floor region section transverse to the control station longitudinal direction.

2. The control station according to claim 1,
   wherein the at least one floor window provided in the at least one second floor region section of the at least one second floor region section can be swiveled from the closed position to the open position in the direction towards a control station interior.

3. The control station according to claim 1,
   wherein the at least one floor window provided in the at least one second floor region section of the at least one second floor region section is supported so that the at least one floor window provided in the control station floor region can swivel in at least one swivel connection region on the control station floor region.

4. The control station according to claim 3,
   wherein the at least one swivel connection region comprises a hinge.

5. The control station according to claim 1,
   wherein the at least one floor window provided in the at least one second floor region section of the at least one second floor region section is able to be swiveled about a swivel axis situated orthogonal to a control station longitudinal direction.

6. The control station according to claim 1,
   wherein on the control station floor region the at least one floor window provided in the at least one second floor region section of the at least one second floor region section has a floor window edge region located closer to an adjacent control station side wall region and a floor window edge region located further away from the adjacent control station side wall region, and that the at least one floor window provided in the at least one second floor region section of the at least one second floor region section is supported on the control station floor region so that the at least one floor window provided in the at least one second floor region section of the at least one second floor region section can swivel in the region of the floor window edge region located further away from the adjacent control station side wall region.

7. The control station according to claim 1,
   wherein in two mutually opposite end regions of the first floor region section second floor region section of the at least one second floor region section is provided, and wherein at least one floor window of the at least one floor window is provided in each second floor region section.

8. The control station according to claim 1,
   wherein the at least one floor window provided in the at least one second floor region section of the at least one second floor region section can be stopped in the open position and/or at least one intermediate position between the closed position and the open position.

9. The control station according to claim 8,
   wherein the at least one floor window provided in the at least one second floor region section of the at least one second floor region section can be stopped by at least one self-locking hinge in the open position and/or at least one intermediate position.

10. The control station according to claim 8,
    wherein the at least one floor window provided in the at least one second floor region section of the at least one second floor region section can be stopped in the open position and/or at least one intermediate position by holding means fastened to the floor window and to the control station floor region, wherein the holding means includes at least one of a holding chain, holding rope or holding rod.

11. The control station according to claim 1,
    further including fastening means for fastening the at least one floor window provided in the at least one second floor region section of the at least one second floor region section in a closed position to the control station floor region.

12. A soil processing machine comprising the control station according to claim 1.

13. The control station according to claim 5,
    wherein the at least one floor window provided in the at least one second floor region section of the at least one second floor region section comprises a window frame supporting a window pane, the window frame being supported at the at least one second floor region section of the at least one second floor region section such as to be able to be swiveled about the swivel axis, wherein the support at least partly bridging the at least one floor window provided in the at least one second floor region section of the at least one second floor region section is fastened to end regions of the window frame situated in the direction of the swivel axis.

\* \* \* \* \*